United States Patent

Weber et al.

[11] Patent Number: 6,088,147
[45] Date of Patent: Jul. 11, 2000

[54] METHOD AND APPARATUS FOR TRANSMITTING SIGNALS IN AN OPTICAL FIBER

[75] Inventors: Jean-Pierre Weber, deceased, late of Solna, Sweden; by Paul Weber, legal representative, Overijse, Belgium

[73] Assignee: Telefonaktiebolaget LM Ericsson, Stockholm, Sweden

[21] Appl. No.: 08/959,786

[22] Filed: Oct. 29, 1997

Related U.S. Application Data

[63] Continuation of application No. PCT/SE96/00626, May 14, 1996.

[30] Foreign Application Priority Data

May 19, 1996 [SE] Sweden .................................. 9501877

[51] Int. Cl.$^7$ ........................... G02B 26/00; H04B 10/00; H04B 10/04; H04B 10/06
[52] U.S. Cl. .......................... 359/237; 359/154; 359/180; 359/189
[58] Field of Search ...................................... 359/181–184, 359/276, 237, 154, 173, 189, 195

[56] References Cited

U.S. PATENT DOCUMENTS

| | | | |
|---|---|---|---|
| 5,128,790 | 7/1992 | Heidemann et al. | 359/132 |
| 5,212,579 | 5/1993 | Huber et al. | 359/182 |
| 5,522,004 | 5/1996 | Djupsjobacka et al. | 385/123 |
| 5,675,674 | 10/1997 | Weis | 385/12 |

*Primary Examiner*—Georgia Epps
*Assistant Examiner*—Suzanne Letendre
*Attorney, Agent, or Firm*—Nixon & Vanderhye P.C.

[57] ABSTRACT

In a method and an apparatus for transmitting signals in an optical fiber, an amplitude modulator (1) is provided for amplitude modulating an optical carrier at high speed with signals to be transmitted. A suppressing means is provided to suppress at least part of one of the side bands of the modulated carrier to reduce the effect of group velocity dispersion in the optical fiber.

15 Claims, 6 Drawing Sheets

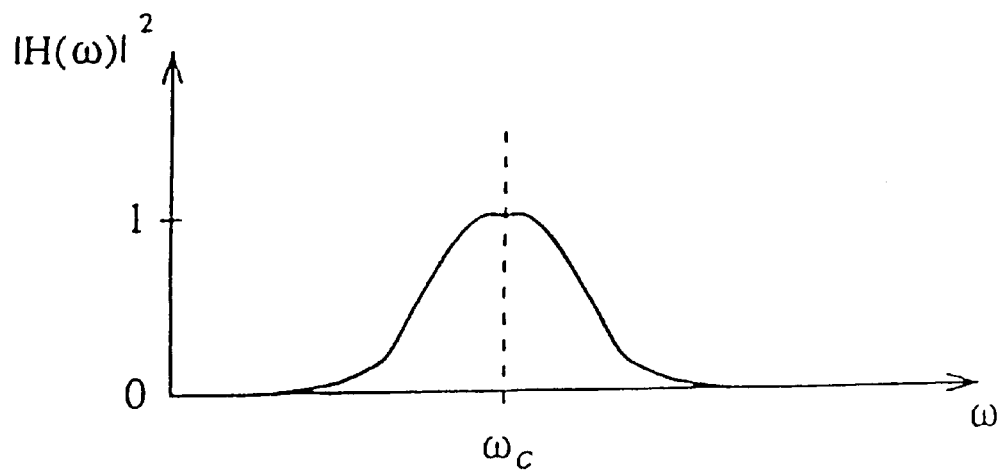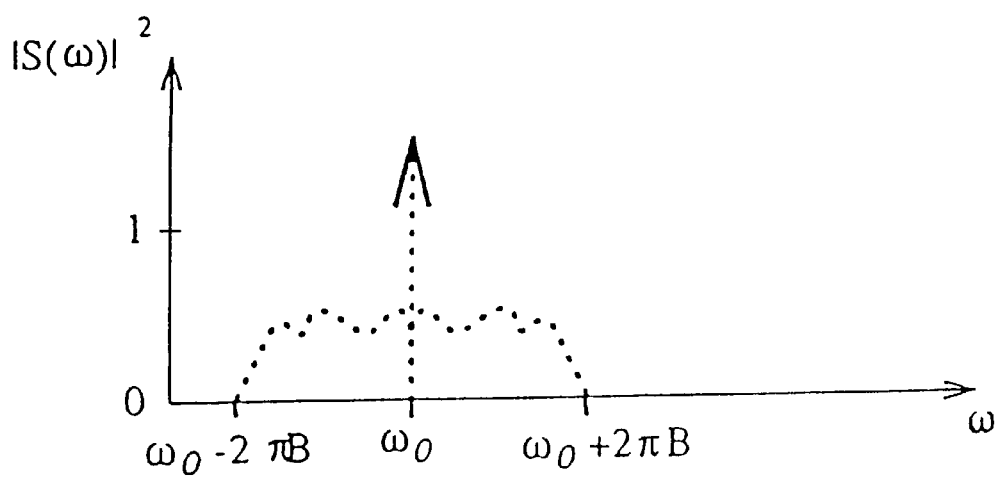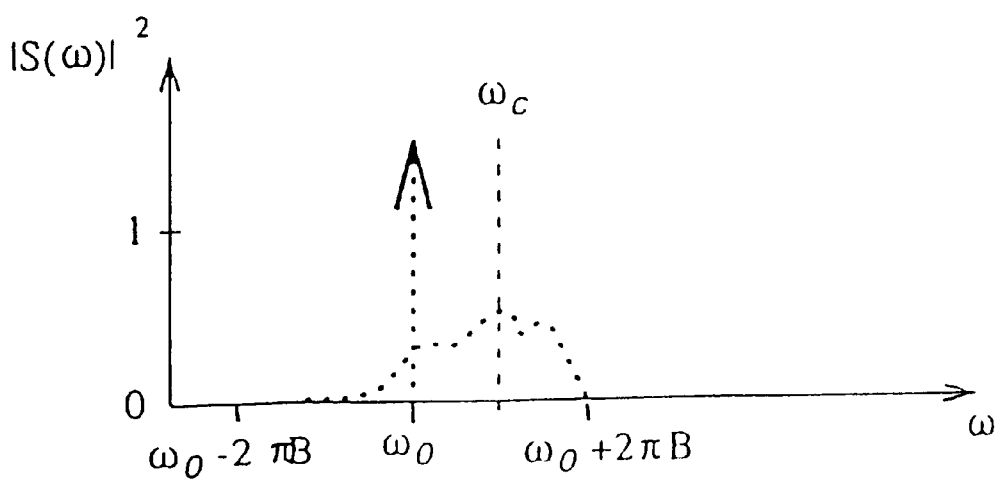
Fig. 6

METHOD AND APPARATUS FOR TRANSMITTING SIGNALS IN AN OPTICAL FIBER

This is a continuation of PCT application No. PCT/SE96/00626, filed May 14, 1996.

TECHNICAL FIELD

The invention relates, on the one hand, to a method for transmitting signals in an optical fibre, comprising amplitude modulating an optical carrier at a high frequency with the signals to be transmitted, and transmitting the so modulated optical carrier in the fibre, and, on the other hand, to an apparatus for transmitting signals in an optical fibre, comprising an amplitude modulator for amplitude modulating an optical carrier at a high frequency with the signals to be transmitted.

BACKGROUND OF THE INVENTION

One of the main problems with high frequency or high speed fiber-optic transmission systems, 10 Gbits/s and above, in development nowadays, is the group velocity dispersion in the fiber which distorts the transmitted signal. Most of the installed fibers have zero dispersion at 1.3 $\mu$m, but minimum loss at 1.55 $\mu$m, where the group velocity dispersion is about −17 ps/(nm.km). This distortion is already a problem at 2.5 Gbit/s for long distance transmission, above 100 km, where it necessitates the use of external modulators instead of directly modulated semiconductor lasers. At 10 Gbit/s, dispersion is the main limiting factor for the transmission distance and this gets worse at higher bit rates since the spectral spreading of the signal is proportional to the bit rate.

The reason why dispersion distorts the signal is that it introduces a phase varying as the square of the modulating frequency. Both side-bands get this phase with the same sign. After detection by a square-law detector, such as a photodiode, this results in a small-signal response of the form:

$$H(\nu) = \cos(F L \nu^2) \qquad (1)$$

where $\nu$ is the modulation frequency and L the transmission distance, which introduces zeroes of transmission in the band of frequencies of interest if L becomes large enough. These zeroes are responsible for the distortion of the signal.

Since the problems increase with the spectral width of the signal being transmitted, one way to improve the situation would be to limit this spectral width. In the radio and TV domain, spectral reduction is used to pack more channels in the available frequency bands and is often done with Single-Side-Band (SSB) modulation, with or without carrier suppression, or with Vestigial Side-Band (VSB) modulation. The problem with carrier suppression is that a very stable, narrow-band local oscillator is needed to recover the signal. This makes it similar to coherent modulation systems (FM, PM) but commercial optical transmission systems nowadays use exclusively Amplitude Modulation (AM) because a simple square-law detector, such as a photodiode, can then be used at the receiver.

Other methods have been proposed previously to overcome the problems caused by dispersion in fibers. The two most promising ones seem to be spectral inversion by four-wave mixing and use of a length of fiber with opposite sign of the dispersion. The problem of spectral inversion is that it is fairly complex, has a low efficiency, must be implemented in the middle of the fiber link and is difficult to use in a wavelength multiplexed system. The main problem with the compensating fiber is the additional losses which must be compensated with an optical amplifier and thus cause a degradation of the signal-to-noise ratio.

BRIEF DESCRIPTION OF THE INVENTION

The object of the invention is to overcome, in the optical domain, in a simple manner and at a low cost, the limitation in transmission distance due to group velocity dispersion in optical fibers.

This is attained by the method according to the invention by suppressing at least part of one of the side bands of the modulated optical carrier to reduce the effect of group velocity dispersion in the optical fibre.

This object is also attained by the apparatus according to the invention in that it comprises a suppressing means for suppressing at least part of one of the side bands of the modulated optical carrier to reduce the effect of group velocity dispersion in the optical fibre.

This side band suppression can be done before transmission in the fibre or, alternatively, after transmission in the fibre but before detection of the optical signal.

An electric circuit for phase correction (and eventually equalization) can also be added to the receiver.

The method and apparatus according to this invention are simple and can be implemented at low cost, which makes them competitive with methods and apparatuses proposed so far.

BRIEF DESCRIPTION OF THE DRAWING

The invention will be described more in detail below with reference to the appended drawings on which FIGS. 6a, 6b and 6c show diagrams illustrating the function of the embodiment according to FIG. 5.

DETAILED DESCRIPTION OF THE INVENTION

Figure 1:
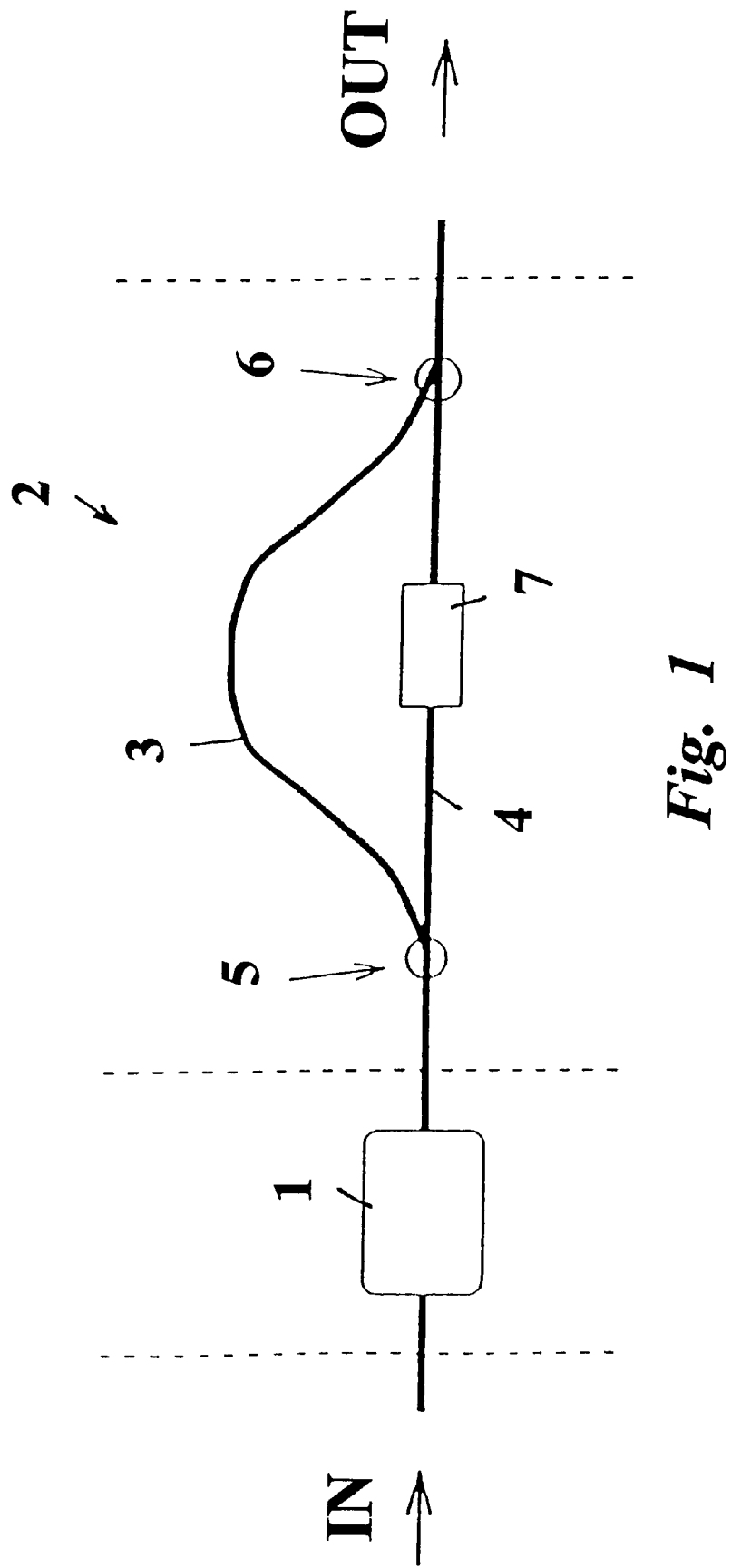
FIG. 1 shows a first embodiment of an apparatus according to the invention.

To attain the object of the invention, i.e. retain the cost and reliability advantages of a simple receiver, either simple SSB or VSB is used according to the invention.

Further analysis of the SSB and VSB modulation schemes shows an even larger benefit than just the reduction of the spectral extension of the signal.

In a pure SSB system, however, there is only one side band and the response becomes:

$$H_{SSB}(\nu) = (\tfrac{1}{2}) \exp(j\, F L \nu^2) \qquad (2)$$

where j is the square root of −1, which is a pure frequency dependent phase. This can be compensated by an electrical circuit performing a phase correction.

Real SSB is difficult to implement in the optical domain. In addition, simulations of the transmission of pseudo-random bit patterns with large extinction ratio for the modulation, which is the way AM modulation is usually done in optical systems, show that pure SSB modulation may not be the best solution.

However, the three VSB modulation embodiments of the apparatus according to the invention to be described below, give a significant improvment of the achievable transmission distance.

The three embodiments of VSB optical modulators to be described are based on the use of an asymmetric Mach-Zehnder interferometric filter (FIG. 1), a Bragg grating filter (FIG. 3) and a Fabry-Perot filter (FIG. 5), respectively.

Other embodiments of the VSB modulator can be trivially obtained by using a different type of optical filter instead of one of the three listed above. Examples include multilayer dielectric filters, interference filters, double Fabry-Perot filters and so on. The only requirement is that the filter suppresses most of one of the side bands while transmitting most of the carrier and the other side band.

As an alternative to the VSB modulator, it is also possible to use instead a normal amplitude modulator of one of the types described below and to perform the filtering of the optical signal at the receiver, after transmission in the fibre. The problems and advantages of this solution are discussed below.

In all cases, an electric circuit for phase correction of the received signal may be required, as shown by equation (2). However, some of the optical filters, such as the Fabry-Perot filter also add a phase to the optical signal, which may make the electric phase correction unnecessary. In addition, an equalization of the electric signal may be advantageous in some cases. This is because most of the filters will not only add a phase, as in the SSB case described by equation (2), but also modify the amplitude (see for example equation (8) below for the asymmetric Mach-Zehnder filter).

VSB modulators

The three embodiments of VSB modulators to be described here are all based on the use of an amplitude modulator and an optical filter. Other methods for obtaining a VSB (or SSB) modulator are known but are either more difficult or impossible to implement at very high bitrates or more complicated and expensive.

Below, it is assumed that the modulator itself does a pure AM modulation (no chirp). This is possible both with semiconductor electro-absorption modulators and also with symmetric Mach-Zehnder modulators (implemented in $LiNbO_3$ or a semiconductor).

The apparatus shown in FIG. 1 comprises an amplitude modulator 1 for amplitude modulating an optical carrier IN at high speed with the signals to be transmitted towards the receiving end. According to the first embodiment of the apparatus according to the invention, the modulator 1 is followed by an asymmetric Mach-Zehnder interferometer, generally denoted 2, having two arms, a longer arm 3 and a shorter arm 4, between a splitter 5 and a combiner 6.

Three parameters to be described below are important for the correct operation of this device:

1. The two arms 3 and 4 of the interferometer 2 must have nearly equal losses so that an out-of-phase recombination in the combiner 6 will result in a large extinction ratio. Due to absorption and scattering, the longer arm 3 will usually have higher losses. Several compensation methods are possible, depending on the material and fabrication method used to make the device. One method that is applicable in general is to use an asymmetric splitting ratio at the splitter 5 in the interferometer 2 so that the powers are equal at the combiner 6. Another method is to have an additional loss or gain in one of the arms 3 and 4 to equalize the total losses.

2. The optical path difference between the two arms 3 and 4 will determine the filter characteristics, since its transfer function can be written as:

$$T_{MZ}(\omega) = \frac{1}{2}\left(1 + \exp\left(j\frac{p_1 - p_2}{c}\omega\right)\right) \quad (3)$$

where the losses are neglected and $\omega$ is the angular frequency of the light, c is the speed of light and $p_i$ is the optical path length of one arm of the interferometer 2, defined as:

$$p_i = \int_{Armi} n_{eff}(s)ds \quad (4)$$

where s is the distance along the arm and $n_{eff}$ is the effective propagation index for the light in that arm. If $n_{eff}$ is the same and constant everywhere, equation (3) reduces to:

$$T_{MZ}(\omega) = \frac{1}{2}\left[1 + e^{j\phi}\exp\left(j\left(\frac{n_{eff}}{c}\Delta d\right)\omega\right)\right] \quad (5)$$

where $\Delta d$ is the length difference between the arms and $\phi$ accounts for any additional phase difference, due for example to a phase control device 7 in one of the arms.

From equation (3) or (5), we can see that the filter transfer function is periodic in $\omega$ and that the period depends on the optical path difference (or $\Delta d$).

3. The relative position of the carrier frequency $\omega_o$ and the maxima and minima of transmission of equation (3) is very important for a good operation of the device. For example, if $\omega_o$ coincides with a minimum, no signal is transmitted and if it coincides with a maximum, the side-bands are symmetric and no improvment is obtained with respect to the unfiltered case. The best positions are when:

$$\left(\frac{n_{eff}}{c}\Delta d\right)\omega + \phi = \left(m + \frac{1}{2}\right)\pi \quad (6)$$

where m is an integer. This corresponds to the positions indicated by dashed lines in the transmission spectrum in FIG. 2a. There are two ways of adjusting this relative position, namely tuning the carrier frequency $\omega_o$ or tuning the filter by adjusting the phase in one of the arms as suggested in FIG. 1, which changes $\phi$. Which solution is the best depends on the technology used to make the filter and on the system requirements.

Figure 2:
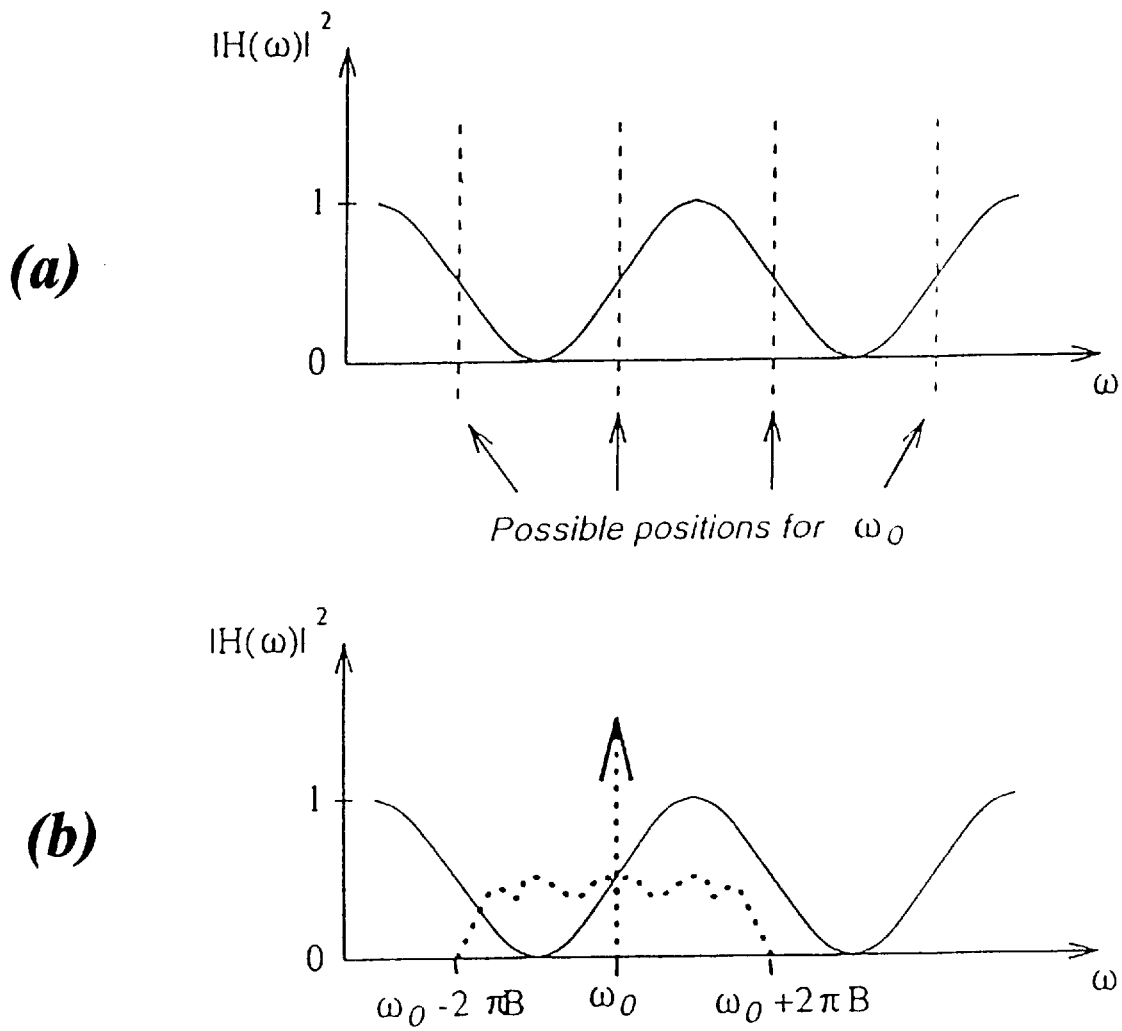
FIGS. 2a and 2b show diagrams illustrating the function of the embodiment according to FIG. 1.

If we define the time delay $\tau$ as:

$$\tau = \frac{n_{eff}}{c}\Delta d \quad (7)$$

and if the bitrate of the modulating signal is B, we see from FIG. 2b and equation (5) how the choice of $\tau$ influences the way the signal is filtered. In FIG. 2b, the dotted lines show a typical modulated optical spectrum and its position relative to the filter transmission spectrum. It can be shown that, with an asymmetric Mach-Zehnder filter tuned as given by equation (6) and shown in FIG. 2a, the small-signal modulation response function after detection with a square-law detector becomes:

$$H_{MZ}(v) = \frac{1}{2}\left(\cos\left(\frac{\tau}{2}v\right)\cos(FLv^2) \pm j\sin\left(\frac{\tau}{2}v\right)\sin(FLv^2)\right) \quad (8)$$

instead of equation (1). We see from equation (8) that the zeroes appearing in equation (1) can be avoided by a correct choice of τ while the phase distortion can be corrected by an appropriate filtering of the electrical signal (as in the pure SSB case given by equation (2)). In addition, it is also possible to perform equalization of the amplitude since there are now no zeroes.

Figure 3:
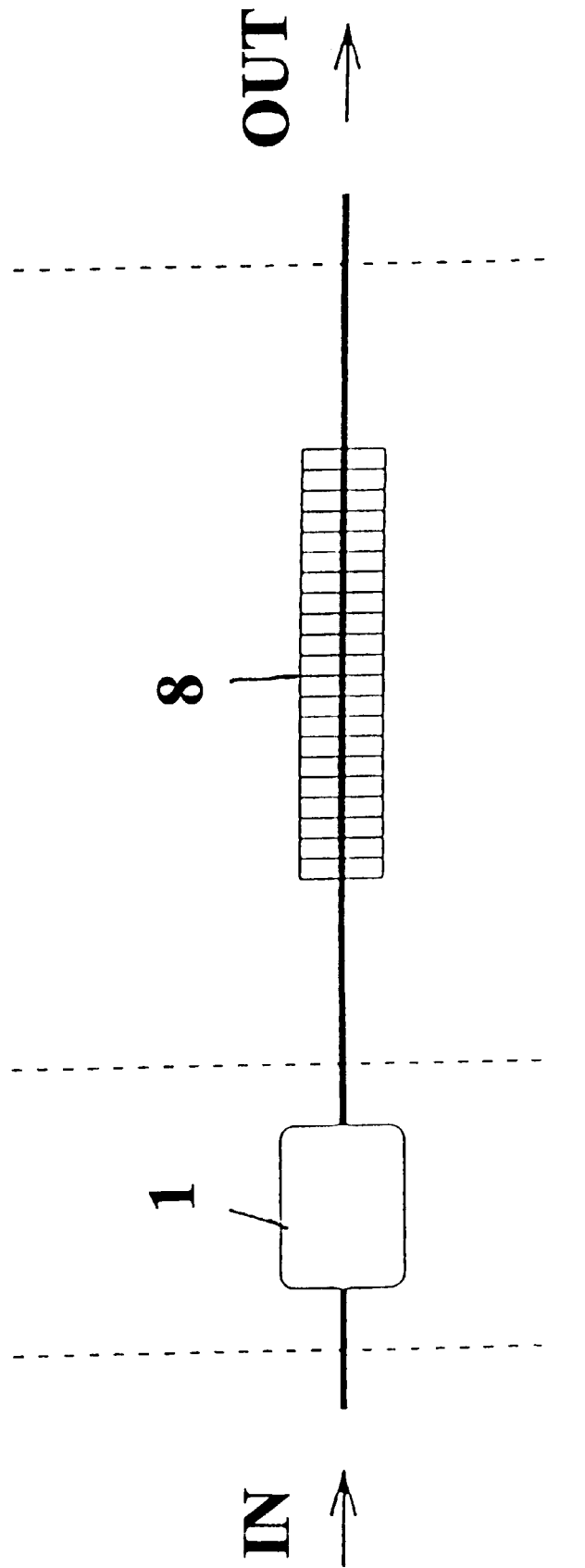
FIG. 3 shows a second embodiment of the apparatus according to the invention.

The embodiment of the apparatus according to the invention, shown in FIG. 3 comprises an amplitude modulator which is denoted 1 since it may be the same as the modulator 1 shown in FIG. 1. The modulator 1 is, according to this embodiment, followed by a Bragg grating filter 8.

Figure 4:
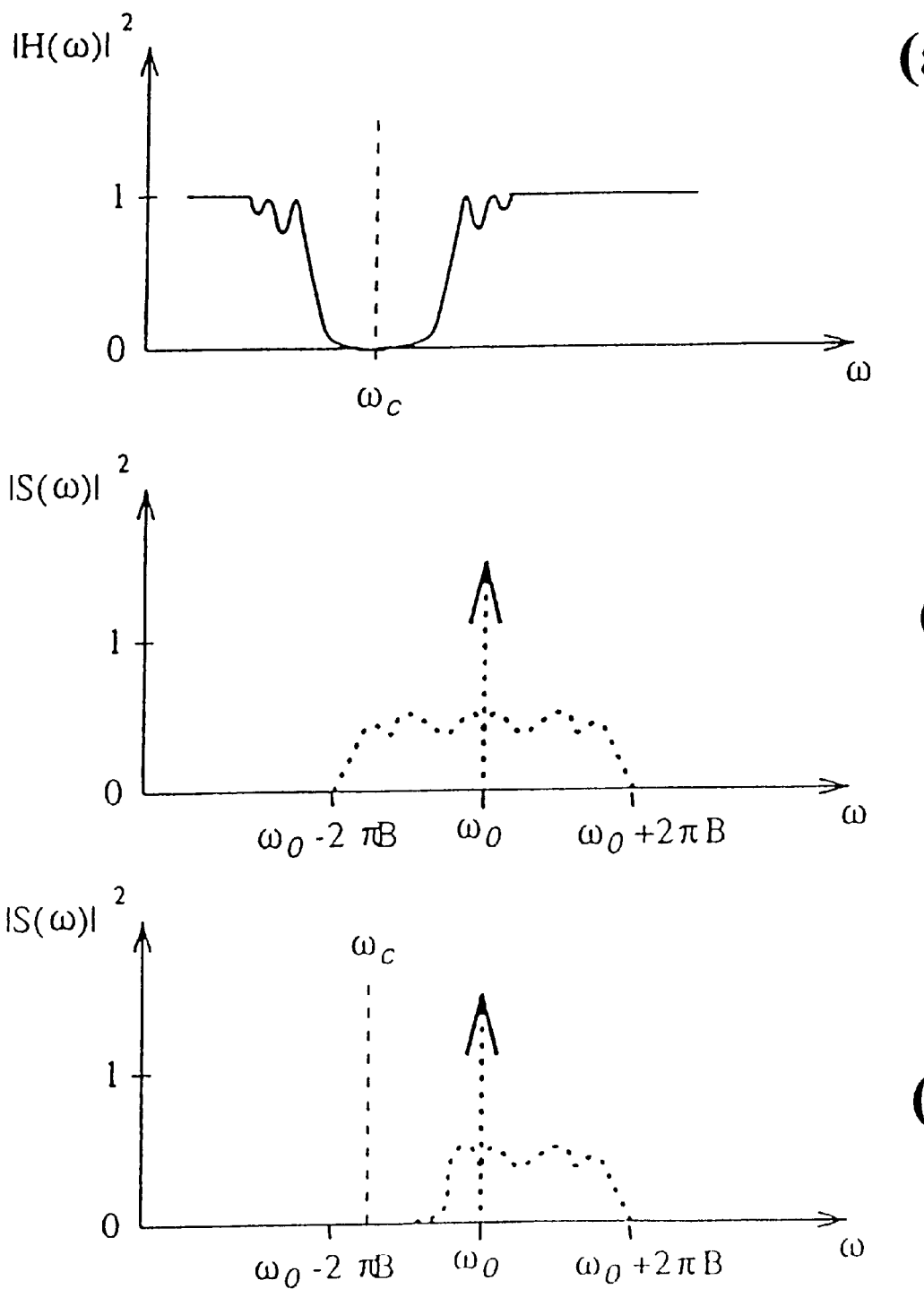
FIGS. 4a, 4b and 4c show diagrams illustrating the function of the embodiment according to FIG. 3.

The principle of operation of the embodiment shown in FIG. 3, is illustrated by the diagrams shown in FIG. 4. FIG. 4a shows the optical transfer function, i.e. the transmission spectrum, of a typical Bragg grating filter, where $\omega_c$ is the filter center frequency. FIG. 4b shows a typical modulated optical spectrum, where B is the bitrate and $\omega_o$ is the optical carrier frequency. FIG. 4c shows the optical spectrum of the signal after filtering. The Bragg grating filter 8 will reflect a certain band of frequencies and transmit the other frequencies, allowing the suppression of most of one sideband to get a VSB optical signal.

Three parameters are important also for the correct operation of this device, namely:

1. The spectral width of the reflection band of the Bragg grating, which mainly depends on the grating coupling coefficient κ. As a first approximation, the Full-Width Half Maximum (FWHM) of the reflection band is given (in wave-length) by:

$$FWHM = \frac{\lambda_c^2 \kappa}{\pi n_{\mathit{eff}}}\left(1 + \frac{1}{\kappa L_g}\right) \quad (9)$$

where $\lambda_c$ is the grating center wavelength, $L_g$ is the length of the grating and $n_{\mathit{eff}}$ is the effective index for propagation of light.

2. The transmission through the grating in the reflection band, which depends on the product $\kappa L_g$. In first approximation, the fraction of the power transmitted through the grating (neglecting losses) at the center wavelength is given by:

$$P_T = 1 - \tan h^2(\kappa L_g) \quad (10)$$

3. The position of the center frequency $\omega_c$ of the Bragg grating (corresponding to $\lambda_c$) relative to the center signal frequency $\omega_o$, wherein $$\omega_c = 2\pi \frac{c}{\lambda_c} \quad (11)$$

$$\lambda_c = 2 n_{\mathit{eff}} \Lambda \quad (12)$$

where Λ is the physical period of the Bragg grating. One example of such a positioning and its effect on the transmitted spectrum is shown in FIG. 4. As can be seen from equation (12), the center wavelength can be adjusted if $n_{\mathit{eff}}$ can be controlled. Below it will be apparent that there are several ways of doing this (depending on the material used). Alternatively, the carrier frequency $\omega_o$ can be adjusted. Again, which solution is best depends on the specific technology used and on the system requirements.

More exact calculations of the characteristics of Bragg gratings can use the methods described in J. -P. Weber and S. Wang, "A new method for the calculation of the emission spectrum of DFB and DBR lasers", IEEE J. Quantum Electronics, 27(10), October 1991, pp 2256–2266, or in A. Yariv and P. Yeh, "Optical waves in crystals", Wiley, New York, 1984.

Figure 5:
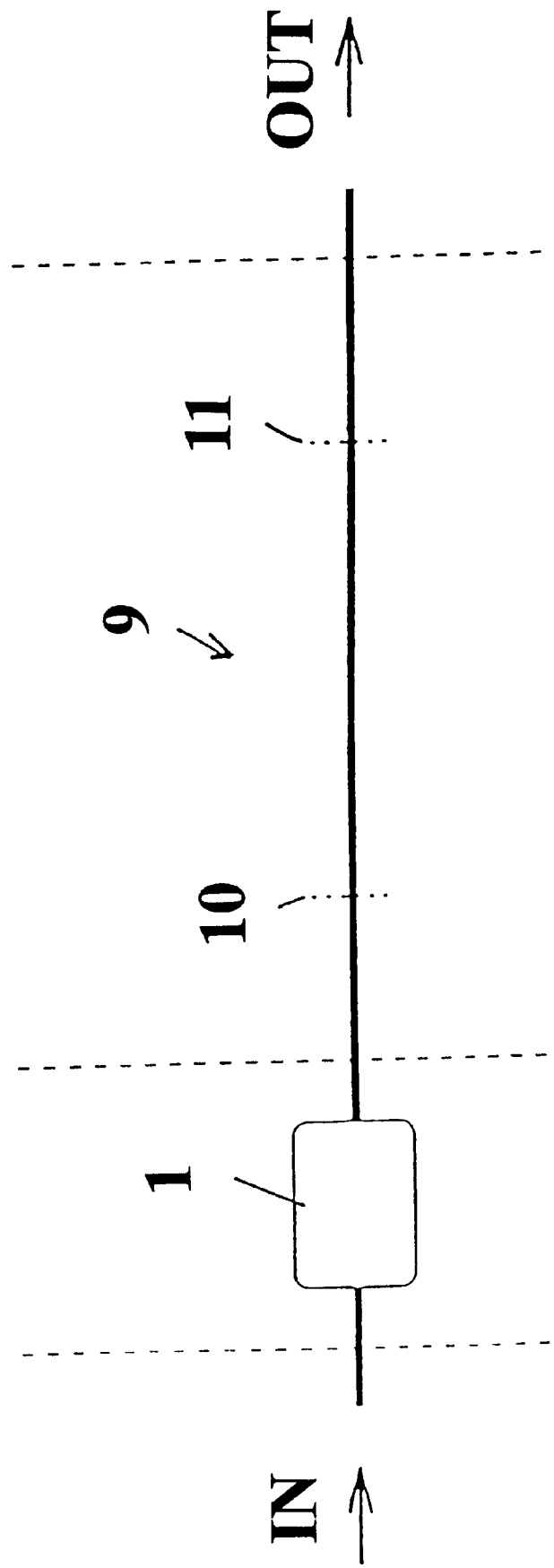
FIG. 5 shows a third embodiment of the apparatus according to the invention.

The basic structure of the embodiment according to FIG. 5 is similar to the two previous embodiments and comprises an amplitude modulator 1 which may be identical to the modulators 1 shown in FIGS. 1 and 3. According to this embodiment of the apparatus according to the invention, the modulator 1 is followed by a filter, generally denoted 9, which filter 9 in this case, is a Fabry-Perot filter having two reflecting elements or mirrors 10 and 11. The principle of operation of the embodiment shown in FIG. 5, is illustrated by the diagrams shown in FIG. 6. FIG. 6a shows the optical power transfer function, i.e. the transmission spectrum, of a typical Fabry-Perot filter, where $\omega_c$ is the filter center frequency. FIG. 6b shows a typical modulated optical spectrum, where B is the bitrate and $\omega_o$ is the optical carrier frequency. FIG. 6c shows the optical spectrum of the signal after filtering. The Fabry-Perot filter 9 is designed and positioned so as to transmit only one side-band and about half of the carrier power.

The three important parameters for the correct operation of this device are:

1. The Full-Width Half-Maximum (FWHM) of the transmission band. It should typically be on the order of the bitrate.

2. The free spectral range which should be at least several times the bitrate.

3. The relative position of the carrier frequency $\omega_o$ and the center wavelength of the transmission band $\omega_c$ which should be adjusted so that the carrier frequency is at a half-maximum transmission point of the filter as shown in FIG. 6.

All these parameters can be determined from the well-known formula for the transmission of a Fabry-Perot filter (see for example M. Born and E. Wolf, Principles of Optics, Sixth Edition, Pergamon Press, Oxford, 1986):

$$T_{FP}(\omega) = \frac{1 - R}{1 - R\exp\left(-j2\frac{n}{c}d\omega\right)} \quad (13)$$

where R is the intensity reflection coefficient of the plates of the FP filter, d is the distance between the two plates, n is the refractive index between the plates and c is the speed of light in vacuum. The intensity transmission is then:

$$T_{FPpower}(\omega) = \frac{1}{1 + F\sin^2\left(\frac{n}{c}d\omega\right)} \quad (14)$$

where F is given by:

$$F = \frac{4R}{(1 - R)^2} \quad (15)$$

As apparent, the FWHM is given (in frequency) by:

$$FWHM = \frac{2c}{nd}\arcsin\left(\frac{1}{\sqrt{F}}\right) \quad (16)$$

and the free spectral range Δω by:

$$\Delta\omega = \frac{\pi c}{nd} \quad (17)$$

In practice, the relative position of the filter and the carrier frequency can be adjusted by fine tuning the distance d.

Several different technologies can be used to implement these VSB modulators, with different levels of integration. For each device, a short summary of some possible realizations will be given. It should be noticed that when the devices are integrated, they will work correctly only if single-mode waveguides are used.

Mach-Zehnder based modulator

Consider first the different technologies available to fabricate the three basic elements of a transmitter, i.e. the laser, the modulator and the asymmetric Mach-Zehnder interferometer (which will be denoted MZI from now on).

Laser: Typically a semiconductor laser will be used (usually based on AlGaAs/GaAs or InGaAsP/InP), but other lasers can also be used, such as a diode-pumped YAG laser. It needs to be operated with a constant output power, stable frequency and narrow linewidth.

Modulator: Typically only two types of modulators used nowadays have the bandwidth required for a high speed transmission system. The first type is the symmetric Mach-Zehnder modulator using the electro-optic effect (in crystals such as $LiNbO_3$)) or the Quantum Confined Stark Effect (in semiconductors) to change the phase in one arm (or both arms) of the interferometer through a change of the refractive index. The second type is the electro-absorption modulator in a semiconductor material, with bulk material or quantum wells in the absorption layer. Both types can be made will no chirp or low chirp.

Asymmetric MZI: This is the element for which there is the largest number of possibilities: free space (using mirrors and beam splitters), optical fibers (using fiber splitters), integrated optics dielectric waveguides realized with $SiO_2$ on Silicon, with diffused waveguides in $LiNbO_3$, or with lattice matched semiconductors such as AlGaAs/GaAs or InGaAsP/InP.

For the realization of the phase control, different solutions are possible. Among others, the following can be mentioned:

piezo-electric elements can be used to change the arm length difference by the required amount for the free space and fiber case.

using the thermo-optic effect to change the refractive index in one arm of the MZI by changing its temperature (for example with an electrical resistance heater or a thermoelectric cooler). This can be used for the fibers and all the integrated optics waveguides.

for the lattice-matched semiconductors, we can also use carrier injection or depletion, BRAQWETS, or the Quantum Confined Stark Effect to change the refractive index.

For the integrated optics waveguides, the splitter 5 and combiner 6 can be made in several different ways. Among them, we have Y junctions, coupled waveguides and multimode interference splitters, which can all give any desired splitting ratio.

Now, the different possiblities for integration can be examined:

1. No integration or hybrid integration: each element can be realized with a different technology, and connected with fibers or free space or eventually waveguides realized on a carrier substrate.

2. Total integration: the laser, modulator and MZI are all fabricated monolithically on the same chip. This is possible with the semiconductors such as AlGaAs/GaAs or InGaAsP/InP and also with $LiNbO_3$ (using Erbium doping for the laser).

3. Partial integration: here, there are two possiblities:

integration of the laser and modulator: possible with the semiconductors and $LiNbO_3$(as for the total integration case)

integration of the modulator and the MZI: also possible with the semiconductors and $LiNbO_3$.

In some cases, it may be necessary to insert an optical isolator at some position to avoid reflections of light back into the laser, which would perturb its stability.

Bragg grating based modulator

For the laser and the modulator, the possiblities are the same as for the MZI case above. The Bragg grating filter 8 can be realized in several ways, including:

UV written grating in a fiber: a UV interference pattern can be used to create a periodic index change in a fiber and thus obtain a Bragg grating.

periodic perturbation of the geometry or composition of a dielectric waveguide, which can be made of semiconductor material or $SiO_2$/Si, but also polymers.

Since the center wavelength of the Bragg grating is given by equation (12), it can be changed by changing the refractive index in the waveguide. The same methods can be used as in the MZI case above when the index in one arm of the interferometer was changed.

If a single Bragg grating cannot cover the desired spectral range, several Bragg gratings in series with slightly shifted center wavelengths or a chirped Bragg grating, i.e. with a varying period, can be used. It may also be desirable to reduce the side-lobes of the reflection band of the Bragg grating. This can be done by chirping the grating or by a variation of the coupling coefficient κ along the grating (compare J. -P. Weber, M. Olofsson, B. Stoltz, "Report on filter optimization", report (deliverable CT3/D4), RACE 2028 MWTN (Multi-Wavelength Transport Network) project of the European Commission, Dec. 5, 1994).

Integration possibilities for the Bragg grating based modulator are similar to the MZI case, except that an isolator must be inserted between the grating and the laser to avoid perturbing the stability of the laser with the reflections from the grating. Since optical isolators cannot be integrated (at least not with the presently available technology), this precludes total integration, but the other alternatives can be used since the isolator can be added before or after the modulator.

Fabry-Perot based modulator

The same possibilities as above are available for the laser and the modulator. The Fabry-Perot filter 9 can be realized in several ways (some are commercially available), including:

bulk optics, using parallel plate mirrors. This device can be tuned mechanically, e.g. with piezo-electric actuators.

fibre Fabry-Perot: instead of free space, the light propagates in a fiber, with high reflection at each end. It can also be tuned with a piezo-electric element.

integrated waveguide: a length of (single-mode) waveguide with large reflections at each end. The reflections can be provided by Bragg gratings or cleaved or etched facets for example. Tuning can be done by putting a phase control section (not shown) in the waveguide as in the MZI case above.

The bulk optics device or the fibre Fabry-Perot cannot be integrated, but the waveguide device can be integrated with the modulator (as in the Bragg grating case). Note that here the same problem exists as in the Bragg grating case: an isolator is needed between the laser and the filter to avoid perturbations caused by reflections. Thus, the same limitations as in the Bragg grating case apply here.

Examples of implementations

In the following, one example of an implementation for each type of device will be outlined. The first two examples will be for implementation in InGaAsP/InP, with integration of the modulator and the filter on the same chip. For the Fabry-Perot, an integrated laser/electro-absorption modulator and a fibre Fabry-Perot filter are assumed. In all cases, the wavelength of the light is assumed to be around 1.55 $\mu$m. These implementations do not require any new processing or fabrication techniques and can be realized with existing technology.

Integrated modulator-MZI

In this example, the structure of FIG. 1 can be realized with the modulator 1 being an electro-absorption modulator, using Y junctions for the splitter 5 and combiner 6 and a forward biased p-i-n heterostructure to inject carriers and control the refractive index in the phase control section 7. Assuming that the waveguides have a core of InGaAsP (bandgap wavelength of 1.38 $\mu$m) which is 0.2 $\mu$m thick and 1.3 $\mu$m wide and the cladding is InP, the effective index for propagation is 3.22 at a wavelength of 1.55 $\mu$m. Carrier injection can decrease the effective index by a maximum of about 0.014 (compare J. -P. Weber, B. Stoltz, M. Dasler and B. Koek, "Four-channel tunable optical notch filter using InGaAsP/InP reflection gratings", IEEE Photon. Techn. Lett., vol. 6 (1), January 1994, pp 77–79) which means that the phase control section must be longer than about 111 $\mu$m to be able to get a $2\pi$ change. The electro-absorption modulator uses a InGaAsP core with a 1.48 $\mu$m bandgp and a reverse-biased p-i-n structure. A length between 100 and 200 $\mu$m is sufficient to get a good extinction ratio. Calculations on some examples show that a good choice of $\tau$ is such that ($\omega_o \pm \pi B$) corresponds to a minimum (maximum) of the filter function (equation 5). Choosing B=10 Gbits/s, this gives $\tau=\frac{1}{2}B=50$ ps, or, by using equation (7), an arm length difference $\Delta d=4.66$ mm. (Note that for higher bitrates, this is smaller.) The splitter 5 can be realized with a length on the order of 100 $\mu$m or less. Thus, the whole device can be easily fabricated on a chip with dimensions less than 4 mm long by 3 mm wide.

Integrated modulator-Bragg grating

This example uses the structure of FIG. 3 and the same InGaAsP/InP waveguides as the previous example. The only difference is the addition of a grating on a portion of the waveguide where carriers also can be injected with p-i-n structure to change the center wavelength. Assuming it is desired for the FWHM to be 2 nm and the center wavelength transmission to be −10 dB. Using equations (9) and (10) it is found that it is necessary that $\kappa$=54.3 cm$^{-1}$ and $L_g$=335 $\mu$m. Thus, this device could be realized on a chip less than 600 $\mu$m long and less than 100 $\mu$m wide. For narrower stop-bands, fiber gratings may be better. But, as stated above, an optical isolator is necessary between the laser and this device.

Fabry-Perot and an integrated laser/modulator

Integrated laser and electro-absorption modulators will soon be commercially available. For a 10 Gbits/s system, a Fabry-Perot with a FWHM of 10 GHz is wanted. Assuming R=0.9 (which is very easy to make), and an index of 1.5, a fiber length (between mirrors 10 and 11) of about 2.11 mm and a free spectral range of 298 GHz are obtained, which is more than enough. Instead of a fiber, a SiO$_2$/Si waveguide could also be used (with temperature tuning). As in the Bragg grating case, it is necessary to put an isolator between the laser and the filter.

Filtering at the receiver

As mentioned previously, an alternative to a VSB (or SSB) modulator is to use a normal amplitude modulator and do the side band suppression by optical filtering after the transmission in the fibre. In FIGS. 1, 3 and 5, this corresponds to inserting the fibre between the modulator 1 and the filters 2, 8 and 9, respectively. The same devices as those described above can be used in this case.

If we have a one channel system with sufficiently low optical power in the fibre (and short enough distance) to neglect non-linearities, this is equivalent to the previous solution. The advantage is that, now, reflections from the filter back towards the laser will not matter since there is usually already an optical isolator between the transmitter and the fibre to avoid problems with reflections from connectors and splices.

However, there are also several problems with this solution. The total optical power launched in the fibre will be higher than with a VSB modulator for the same power at detection. This can be a problem since non-linear effects increase proportionally to the square of the optical power. Also, the spectral width of the optical signal in the fibre will be larger, which means that channel separation must be larger in a Wavelength multiplexed (WDM) system.

Because of these problems, it will in general be better to use a VSB (or SSB) modulator.

What is claimed is:

1. A method for transmitting signals in an optical fiber, comprising:

amplitude modulating an optical carrier at a high frequency with the signals to be transmitted, the modulated optical carrier including two side bands;

transmitting the modulated optical carrier in the fiber; and suppressing at least part of one of the side bands so that the suppressed part of the one side band is not detected at a receiver and passing at least part of the other of the side bands so that the passed part of the other side band is detected at the receiver to reduce the effect of group velocity dispersion in the optical fiber.

2. A method according to claim 1, wherein the suppression takes place at a receiving end of the fiber.

3. A method according to claim 1, wherein the suppression is accomplished using vestigial sideband modulation.

4. A method according to claim 1, wherein the suppression is accomplished using single-sideband modulation.

5. The method according to claim 1, wherein the suppression occurs at the transmitting end of the optical fiber.

6. An apparatus for transmitting signals in an optical fiber, comprising:

an amplitude modulator for amplitude modulating an optical carrier at a high frequency with the signals to be transmitted, the modulated optical carrier having two side bands, and a suppressor suppressing at least part of one of the side bands so that the suppressed part of the one side band is not detected at a receiver and passing at least part of the other of the side bands so that the passed part of the other side band is detected at the receiver to reduce the effect of group velocity dispersion in the optical fiber.

7. An apparatus according to claim 6, wherein the suppressor is located at a receiving end of the fiber.

8. An apparatus according to claim 6, wherein the suppressor includes a vestigial sideband modulator.

9. An apparatus according to claim 7 or 8, wherein the suppressor includes an optical filter.

10. An apparatus according to claim 9, wherein the optical filter includes an asymmetric Mach-Zehnder interferometric optical filter.

11. An apparatus according to claim 9, wherein the optical filter includes a Bragg grating optical filter.

12. An apparatus according to claim 9, wherein the optical filter includes a Fabry-Perot optical filter.

13. An apparatus according to claim 8, wherein said suppressor comprises an optical filter.

14. An apparatus according to claim 6, wherein the suppressor includes a single-sideband modulator.

15. An apparatus according to claim 6, wherein the suppressor is located at the transmitting end of the optical fiber.

* * * * *

UNITED STATES PATENT AND TRADEMARK OFFICE

CERTIFICATE OF CORRECTION

PATENT NO.     : 6,088,147
DATED          : July 11, 2000
INVENTOR(S)    : Jean-Pierre WEBER It is certified that error appears in the above-identified patent and that said letters patent is hereby corrected as shown below:

Title page item [30],
change the face of the patent as follows:

"[30] Foreign Application Priority Data

May 19, 1996   [SE]   Sweden        9501877"

to

-- [30] Foreign Application Priority Data

May 19, 1995   [SE]   Sweden        9501877" --

Signed and Sealed this

Seventeenth Day of April, 2001

Attest:

NICHOLAS P. GODICI

Attesting Officer         Acting Director of the United States Patent and Trademark Office